J. FITZGERALD.
Muzzle-Loading Ordnance.
No. 6,090.
2 Sheets—Sheet 1.
Patented Feb. 6, 1849.
Fig. 8.
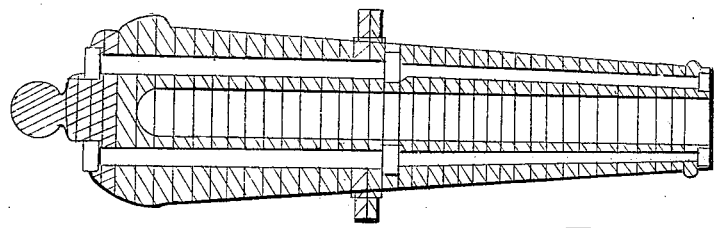
Fig. 9.    Fig. 10.    Fig. 11.
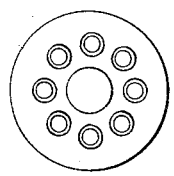 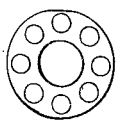 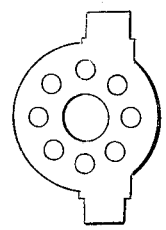
Fig. 12.
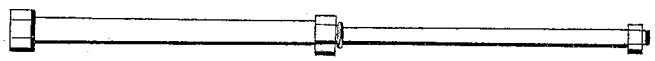
Fig. 13.
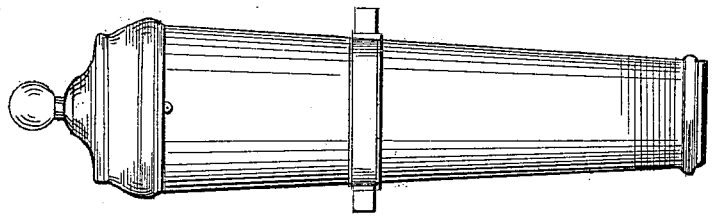

2 Sheets—Sheet 2.
J. FITZGERALD.
Muzzle-Loading Ordnance.
No. 6,090. Patented Feb. 6, 1849.
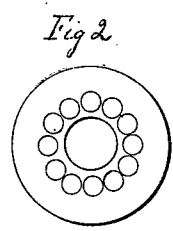 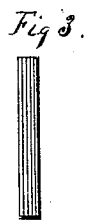 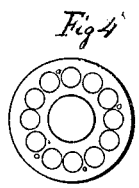
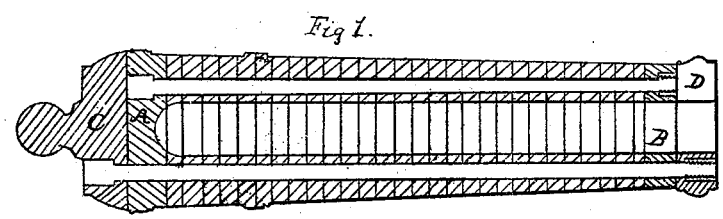
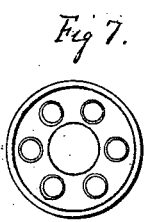 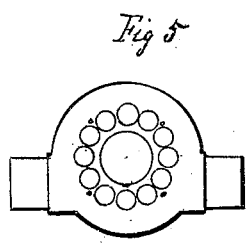 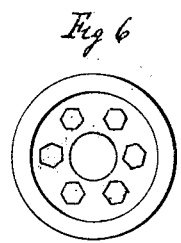

UNITED STATES PATENT OFFICE.

JESSE FITZGERALD, OF NEW YORK, N. Y.

BOLT AND DISK SECTIONAL CANNON.

Specification forming part of Letters Patent No. 6,090, dated February 6, 1849.

*To all whom it may concern:*

Be it known that I, JESSE FITZGERALD, of the city, county, and State of New York, have invented a Sectional Cannon; and I hereby declare that the following is a full and exact description.

To enable others to construct this kind of gun, I proceed to describe it with reference to the drawings hereunto annexed, and making part of this specification.

Plate I: Figure 1, longitudinal section; Fig. 2, one of the plates near the breech; Fig. 3, edge of one of the sections, which consists of a number of plates riveted together; Fig. 4, one of the plates near the muzzle; Fig. 5, one of the plates at the trunnion; Fig. 6, the breech; Fig. 7, the muzzle.

Plate II: Fig. 8, longitudinal section; Figs. 9, 10, 11, plates; Fig. 12, one of the rods; Fig. 13, the cannon.

The plates are cut in circles by rotary shears, and then the holes are all struck at once, having (besides the holes for the bore and the rods) four or more rivet-holes. (See Figs. 2 and 4.) These plates are riveted together in sections of convenient weight, (the holes being first cleared or countersunk), and the sections are complete, Fig. 3. The rods are plain bolts with nuts at each end, or with a head at one end, (the breech.) Six of the bolts are short and six long. When the gun is put together, the plates are put upon the six short bolts first, and it is screwed up tight, the heads being sunk into a piece of cast metal, A, at the breech, and the nuts in like manner sunk into a piece, B, at the muzzle. The other six bolts are then put through and screwed up, the heads being sunk into the breech-piece C and the nuts sunk into the muzzle-piece D. Thus only six of the bolts appear on the outside. It is thus taken to pieces easily for transportation.

Another plan is shown in Plate II, Fig. 8. The bolt is made of double the size between the breech and the trunnion, where there is a nut to hold it, and another at the end.

I also construct the gun with double the number of bolts from breech to trunnion as from that to the muzzle, or, in other words, extend only half of the number of bolts through from end to end; but the method first described is that which I prefer as the most simple.

I prefer, also, to make the plates of very thin iron, as the thinner it is rolled the greater proportionally is its strength; but a variety of kinds is most economical—as, for instance, the strongest iron or steel at the powder-chamber, and poorer iron near the muzzle, or alternate sections of cast and wrought iron or brass.

What I claim as my invention, and desire to secure by Letters Patent, is—

The combination of metallic plates and bolts in the manner above described, to construct a cannon.

In witness whereof I have hereunto set my hand at the city of New York, July, 1848.

JESSE FITZGERALD.

Witnesses:
 I. DWIGHT STICKNEY,
 OWEN G. WARREN.